United States Patent Office

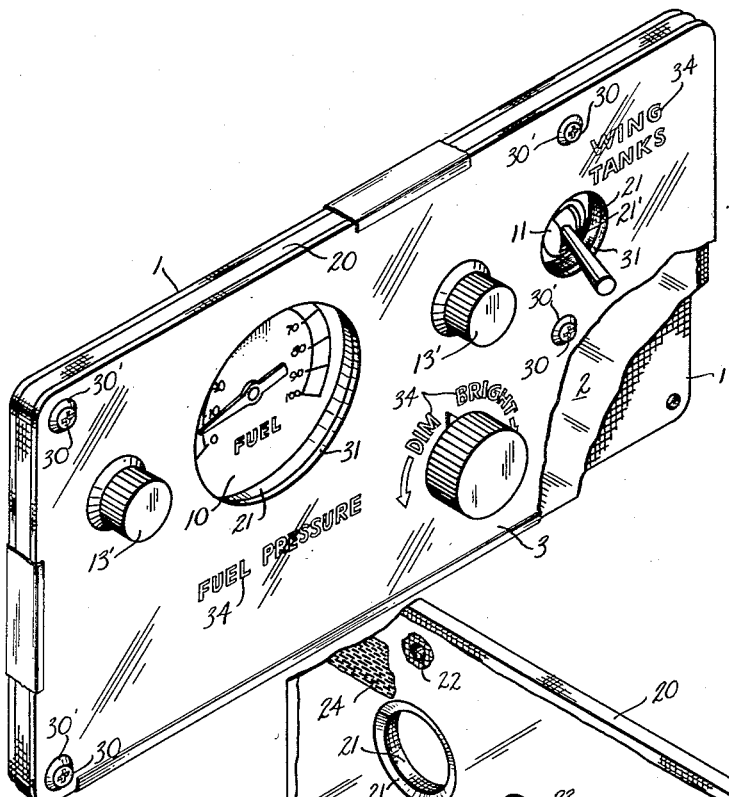
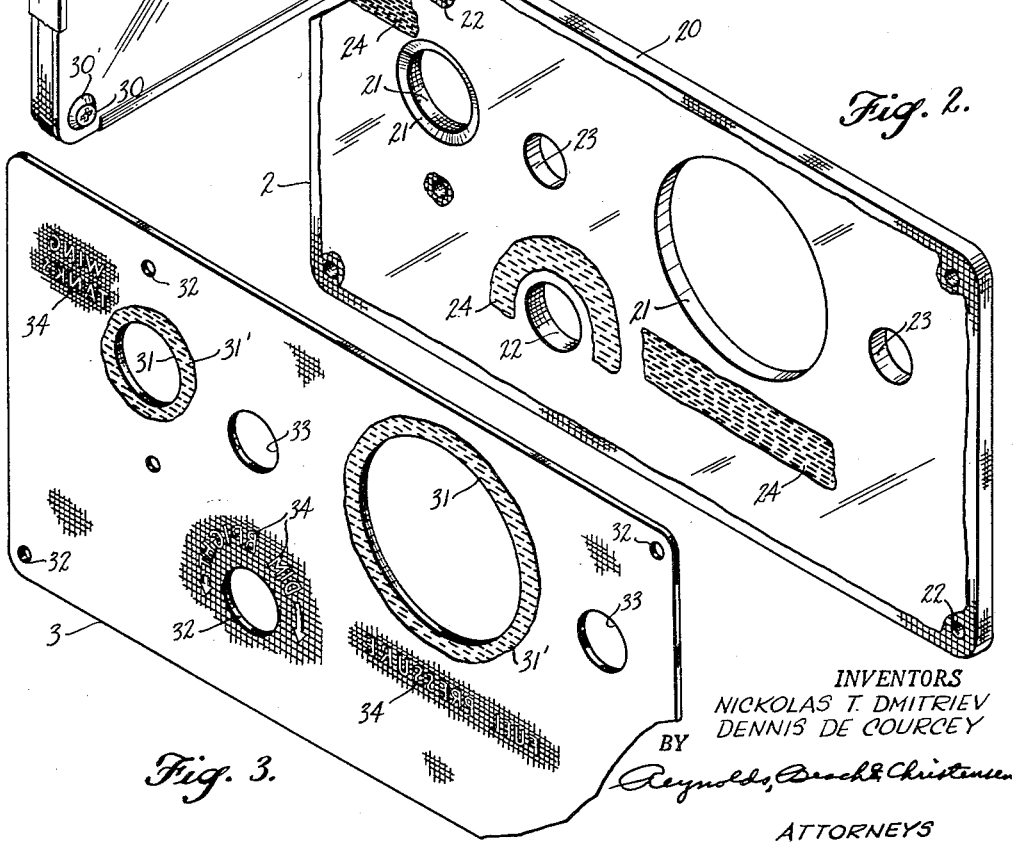

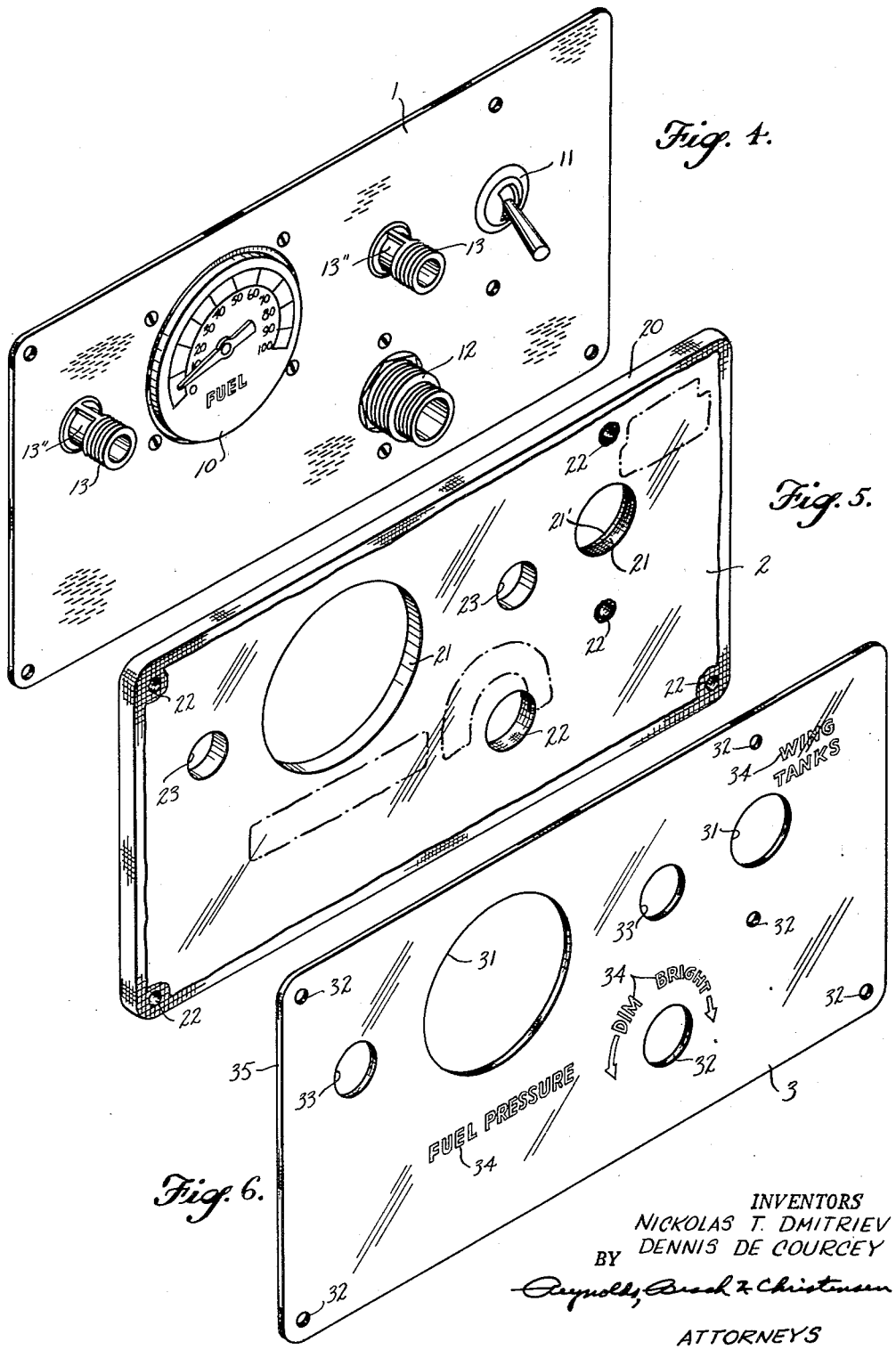

2,848,830
Patented Aug. 26, 1958

2,848,830

INDIRECTLY ILLUMINATED INSTRUMENT PANELS

Nickolas T. Dmitriev and Dennis G. De Courcey, Seattle, Wash., assignors to Boeing Airplane Company, Seattle, Wash., a corporation of Delaware Application May 8, 1951, Serial No. 225,173

5 Claims. (Cl. 40—130)

The present invention is concerned with the illumination of instrument panels, such as used on automobile and boat dashboards and in airplane cockpits, and especially the indirect illumination of indicia and instrument faces on such panels. The effect desired is for such indicia to glow in darkness and sufficient light be projected onto the faces of instruments to enable their indications to be read easily in darkness, while at the same time the indicia is easily readable when the face of the instrument panel is illuminated, either by daylight or by artificial illumination.

In providing a solution for the problem of thus illuminating instrument panels, it is important that the radiation of light from the instrument panel be an absolute minimum to afford maximum visibility through wondows adjacent to the instrument panel without reflection of light from the windows or diffusion of light over them. At the same time absolute reliability of illumination is desired, and whatever the extent of the instrument panel, uniformity of illumination in its various parts is preferred.

A principal object of the invention is to provide an instrument panel structure which will utilize positive light sources to effect the desired illumination, and these will be distributed appropriately over the instrument panel to illuminate instruments and indicia in its various parts uniformly, yet without unnecessary radiation from the instrument panel. In accomplishing this object light from the distributed light sources is transmitted edgewise through a transparent sheet to the locations of the various instruments and indicia, and in order to effect most efficient transmission of light through such sheet parallel to its principal surfaces opaque cover sheets are placed over the principal faces of the light transmission sheet to control radiation of light from such surfaces. An incidental advantage of this construction is the protection afforded the surfaces of the light transmission sheet.

A specific object of the invention is to concentrate light carried by the light transmission sheet on the face of an instrument or other element on the panel to be illuminated, so that it will be lighted most effectively by a minimum amount of light escaping from the instrument panel transmission sheet.

For accomplishing the objects of the invention the instrument panel is of laminated construction, including an opaque backing sheet preferably of metal, upon which the instruments and light sources are mounted. Overlying the backing sheet is the light transmission sheet of clear plastic or plate glass, through which light from the light sources is transmitted edgewise of the sheet, that is, parallel to its principal faces. The front principal surface of the light transmission sheet is covered by a facing sheet which is opaque except in those portions constituting the actual indicia, which are translucent. The amount of light projected from the light transmission sheet through such translucent areas may be regulated in accordance with the distance of the various indicia from the light sources. Moreover, the effectiveness of liberation of light from the light transmission sheet may be increased by making certain portions of the light transmission sheet surfaces opaque.

Additional features, objects and advantages of the invention will be evident from the following description of the representative embodiment of the invention in the instrument panel illustrated in the drawings.

Figure 1 is a top perspective view showing the front of an instrument panel assembly.

Figure 2 is a top perspective view of the light transmission sheet of such instrument panel assembly, and Figure 3 is a top perspective view of the facing plate of such assembly, both seen from the back.

Figures 4, 5 and 6 are top perspective views of the backing plate, the light transmission plate and the facing plate of the instrument panel assembly, all viewed from the front, and the plates of the three views being illustrated in the relationship in which they would be assembled.

The instrument panel of the type to which this invention relates has two types of illumination problem, either or both of which may be involved in any particular panel. The first problem is the illumination of indicia, designating the names of gauges or other elements mounted on the instrument panel, and the second problem is that of illuminating the faces of instruments or other elements which might be mounted on the instrument panel, such as toggle switches, for example. In providing such illumination, such elements and instruments should be lighted sufficiently so that they can be read easily, and the lettering should be easily readable, yet the light actually radiated from the instrument panel should be a minimum to interfere as little as possible with visibility through adjacent windows. In many instances sufficient glow of the panel elements may be obtained with decreased vision interference by providing colored light sources instead of white, and sources of red light are particularly recommended.

A further way in which unnecessary radiation of light may be avoided is to utilize the light produced in the most efficient possible manner and to illuminate all parts of the instrument panel approximately equally. Otherwise, in providing at least the minimum effective illumination for one part of the panel, too much light may be radiated from another part. The general level of illumination throughout the panel may be controlled, such as by providing a suitable rheostat for varying the current through the globes constituting the light sources.

The composite laminated instrument panel shown in the drawings is admirably suited to satisfy the requirements set forth above. As shown in Figure 1, the composite panel includes a backing plate or sheet 1, an intermediate light transmission plate or sheet 2, and a cover or facing sheet 3, which are secured in intimate face-to-face engagement by suitable bolts 30, the heads of which preferably seat on rubber washers 30'.

The backing sheet of the panel assembly, shown separately in Figure 4, preferably is sufficiently thick so that it will be stiff enough to function as a mounting for various gauges, such as the fuel pressure gauge 10, and control elements, for example the toggle switch 11 and rheostat 12, as well as for light sockets 13 to receive lights for illuminating the instrument panel. It will be understood, of course, that the arrangement of instruments and control elements on the backing sheet is purely a matter of choice, but after these items have been located the lights 13 should be positioned and should be adequate in number to supply a sufficient degree of illumination and distributed most advantageously.

The intermediate panel 2, shown separately in Figures 2 and 5, preferably is made of transparent plastic, such as methyl methacrylate, which is clear and transparent, although other materials, and even plate glass, could be used reasonably satisfactorily. Glass would be more expensive, much heavier, and more brittle, and it would be much more difficult to drill the required holes in the sheet. This sheet has in it holes corresponding to various components on the plate 1, as will be explained more in detail, but by enabling such components to be received respectively in the holes of plate 2, its rear face may be placed in contiguous engagement with the front face of the plate 1 when the parts of the panel are assembled to form the composite structure shown in Figure 1.

The plate 3 preferably is also of transparent plastic material such as methyl methacrylate, although again this plate may be made of glass if desired. Like the plate 2, plate 3 has apertures in it of sizes and at locations corresponding to the components mounted on the backing plate 1, so that the back surface of cover plate 3 may engage contiguously the front surface of the intermediate plate 2 while components mounted on the backing plate 1 project through or are visible through such holes. Moreover, if the instrument panel is not to bear identifying indicia in any particular instance the front plate 3 can be made of opaque metal. Otherwise, this plate must be treated to render it opaque, except in the indicia bearing portions.

In general the system of illumination contemplates projecting light edgewise into the transparent intermediate plate 2, which will transmit such light to the various portions of the panel to be illuminated in a direction edgewise of the plate, that is, parallel to its principal surfaces. Radiation from the edge of this plate is prevented by coating it with opaque paint indicated at 20, and light will escape from its principal surfaces only where the smooth surface is interrupted, such as by being sandblasted, painted, or otherwise roughened. The principal surface of the light transmission plate 2 will thus be treated in areas where indicia on the completed instrument panel is to be illuminated, and, in addition, edge portions formed by apertures will project light from the light transmission plate onto the surface of an instrument or element to be illuminated.

There is some slight tendency for light to be radiated from the principal surfaces of the light transmission plate 2 in almost every case, because it is impossible to make these surfaces absolutely smooth. It has been found, however, that the light transmitting ability of the plate is impaired if the principal surfaces are painted with opaque paint or if any material is bonded to the principal surfaces, such as by gluing or cementing an opaque sheet to such surfaces. The light transmitting ability of the plate is not impaired as much merely by holding an opaque sheet tightly against a principal surface of the light transmission sheet as it would be if the two are bonded together in face to face relationship, although in some instances it may be desirable to bond them together along their edges and around the margins of the holes. In the present construction the backing sheet 1 is of opaque material, and preferably its surface adjacent to the light transmission plate 2 is painted white. Also, except in those portions representing indicia through which light is to be transmitted, the facing sheet 3 has its back covered with opaque paint, the illustration of it in Figure 3 being lined to represent the color black.

The plates 2 and 3 have in them two principal types of holes. The first of these, designated 21 and 31, respectively, register with instruments or other elements to be illuminated. The edges of holes 21 registering with the instruments are unpainted to enable light to escape from the sheet 2 for illumination of the instruments. The amount and direction of light escape can be varied depending upon the nature of illumination desired. The switch hole 21 has its corner 21' adjacent to plate 1 beveled at an angle to the plate surface less than the critical angle, such as 30 degrees, so that feeble stray light rays will be emitted to glow at the base of the switch handle. The width of the beveled surface will be selected in accordance with the amount of illumination desired, and the remainder of the edge of the aperture will be painted opaquely to prevent emission of light from it. Much less light will escape from this hole than required for illumination of an instrument.

The second type of hole in plates 2 and 3, designated 22 and 32, respectively, are to receive elements mounted on the backing plate 1 which do not need to be illuminated and do not constitute light sources. Such elements, for example, are the shanks of bolts 30 which function to secure together the plates of the assembly, or the rheostat housing 12. The edges of these holes, both in plates 2 and 3, are rendered opaque by being painted, and to insure complete coverage of the corners of such apertures the paint may be extended to form a ring around such holes on each of the principal surfaces of plate 2 and of plate 3.

Holes 23 in plate 2 and 33 in plate 3 receive the fixtures 13 mounted on plate 1 for the lights to illuminate the intermediate light transmission plate 2. In Figure 4 the front ends of these fixtures are shown to be threaded to receive caps 13', screwed onto them when the instrument panel has been assembled in the completed form of Figure 1. These caps are opaque as are the threaded portions of the light fixtures, so that no light is liberated from these fixtures at the front of the cover plate 3. Instead, these fixtures are designed to project light only edgewise through the intermediate plates 2 by radiating light from windows 13" in registry with the clear edges of apertures 23 in the light transmitting plate. The windows 13" may be, and preferably are, colored, for example, red, so that the indicia on front plate 3 and the elements mounted on backing plate 1 will be illuminated in color.

Indicia on the instrument panel to be illuminated may be formed as interruptions 34 in the opaque coating on the back of cover plate 3. These interruptions will take the form of letters, numbers, arrows, and other indicia, as may be desired. Instead of these indicia portions being completely transparent, however, it is preferred that they be only translucent. This effect may be produced by covering the portions of the back of sheet 3 where the opaque coating has been interrupted with a light translucent film of paint, such as of white paint, which will be in contrast to the dark, opaque coating, preferably black, as viewed through the transperent material of the plate 3 from the front. This contrast will enable the indicia to be discerned easily when the instrument panel is not illuminated indirectly, but is lighted directly from the front by daylight or artificial illumination. As distinguished from the large opaque area of the facing sheet 3, the portions 34 in which the opaque coating is interrupted and the holes 31 through which light is reflected from an instrument or other element may be termed generically light penetrable portions of the facing sheet.

In order to illuminate the areas of plate 3 indirectly where the opaque coating has been interrupted so that the indicia will be visible, provision must be made for liberating light from the light transmission plate 2 at corresponding locations. Such light liberation is effected by roughening a principal surface of the plate 2 at locations generally in registry with the interruptions in the opaque covering on the back of plate 3. Such roughening preferably is accomplished by applying bright paint in the appropriate localities, so that the illumination of all indicia may be substantially equalized by selecting the weight of the paint coating in each instance generally in accordance with the distance of the particular indicia from the light source or sources. White paint is preferable for this purpose, and the patches 24 are lined to represent this color. By using white paint the color of the illuminating light may be altered as desired merely by changing the color of the windows 13" in the light sources 13.

Because it is desirable to render the indicia in all parts of the instrument panel legible by use of a minimum quantity of light generated at the light sources 13, it is important that the thickness of paint coating 24 in the various patches be proper to give a uniform intensity of illumination to the various indicia locations. Initially, therefore, the thickness of all patches 24 may be the same in order to determine the maximum illumination of indicia which can be obtained by use of light sources of given intensity. If the paint patches are placed on the back of the light transmission plate 2, and covered closely by the opaque backing plate 1, light will be diffused in the vicinity of the paint patch and reflected through the opposite principal surface of the sheet and the portions of sheet 3 in which the opaque paint on its back is interrupted, representing indicia. The thicker the coating of white paint in a given instance the better will be the reflection from the surface, and consequently the more light will be reflected through the indicia portions of plate 3. Conversely, the thinner the paint coating, the less diffusion and reflection there will be. Substantial uniformity of indirect illumination of the various indicia locations can be secured, therefore, by making the paint coating relatively thick and white at locations relatively far removed from the light sources, such as at the upper left corner of Figure 2, and, conversely, making the paint coating relatively thin adjacent to the light sources, such as in the central portion of the instrument panel at the location of the rheostat indicia. Such gradations in the thickness of paint coating may be established initially by making all the patches 24 of uniform density initially, and then removing part of the paint from those nearer the light sources with paint thinner until the intensity of illumination of the various indicia is equalized. With practice, particularly on an instrument panel of given type, a workman will be able to apply the proper weight of the paint coating in each patch 24 initially without experimentation.

While the method of obtaining projection of light through the indicia portions by diffusion and reflection of light from light transmission plate 2 has been described, an alternative procedure is to place the paint patches 24 of Figure 2 on the front of this plate instead of the back. With this construction the painted patches will cause light to be transmitted through the painted portions of the plate front and the indicia portions of plate 3 where the opaque coating on its back has been interrupted. By this procedure, however, it has been found that the illumination of the indicia is not quite as efficient, and it is more difficult to obtain uniformity of indicia illumination.

In illuminating the instrument faces or other elements mounted on the backing plate 1, the principle of light transmission is employed rather than that of diffusion and reflection. Thus the light is transmitted from the light transmission plate 2 through the edges of the apertures 21 encircling the instruments, such as the fuel pressure gauge 10, and through the beveled surfaces 21' by which switch 11 is illuminated, as shown in Figure 1. The amount of light projected onto a particular element may be regulated by varying the width to which the corner of the aperture is chamfered. Also, light for illuminating such an element or instrument may be utilized more efficiently by providing a surface for reflecting stray light beams at the periphery of apertures 21 through the unpainted edge of an aperture 21. Such reflecting surfaces are formed by rings of white paint 31' on the back of plate 3 and encircling the apertures 31. For this reason the hole in plate 3 should be smaller than the corresponding hole 21 in plate 2. Alternatively, these reflecting rings could be on the front surface of light transmitting plate 2 since this surface is contiguously engaged by the opaque surface of the cover plate 3.

In order to conserve light it is, of course, essential as previously mentioned that its escape from the edge of plate 2 be prevented, which can be accomplished by coating the edge with an opaque paint layer 20. It is also helpful to cover the edge of the cover plate 3 with an opaque paint layer 35 if this plate is made of transparent material. In addition the edges of these plates should be covered with opaque material such as black vinyl tape, to protect the paint against chipping. The edges of these plates may be protected further if desired by providing an angle frame member carried by the backing plate 1, having one flange encircling the edges of the sheets 2 and 3, and the other flange lapping over the front of the cover plate. Any possible glare which might occur from reflection on the face of the completed instrument panel may be prevented by coating it with a flat, nonreflective, clear lacquer.

The particular paint used to render the edges of the plates opaque is optional, but preferably a coat of white paint covered by a coat of black paint is used. Also, the area of the paint reflective or transmission patches on the surfaces of plate 2 may vary in extent as compared to the area of the indicia, but a patch approximately one and one-half times as wide as the height of the indica letters has been found to be satisfactory. In order to avoid undesirable light leakage from plate 2, it is important that the opaque coating on the back of plate 3 be absolutely unbroken except for the formation of the indicia characters. The general intensity of illumination of the instruments and glow of the indicia may then be regulated by adjustment of the rheostat 12, which will alter the intensity of the light sources. If one of the light sources should fail, rendering indicia in its vicinity illegible, the rheostat may be adjusted to increase the illumination afforded by the other light sources to a point where the indicia adjacent to the inoperative light source will be legible. While more light than desirable will escape from the front of the instrument panel in such event, the amount will not be very objectionable, and all the indicia on the instrument panel will be readable despite the failure of one or even more light sources, so long as a reasonable number of light sources continue to function.

We claim as our invention:

1. An instrument panel comprising an opaque backing sheet having mounted thereon an element to be illuminated, a light transmission sheet in proximate face-to-face relation to said backing sheet having an aperture therethrough in registry with but at least partially in front of at least a portion of said element for release of light from the edge of said aperture to said element, a light source operable to project light edgewise into said light transmission sheet, and a facing sheet in proximate face-to-face relation to the side of said light transmission sheet remote from said backing sheet and having an aperture therethrough in registry with and in front of said element and said light transmission sheet aperture, said facing sheet being of transparent material and having an opaque coating covering the surface thereof next to said light transmission sheet, said opaque coating being interrupted to delineate indicia in areas where said facing sheet is uninterrupted and is operable to transmit to the surface of said facing sheet remote from said light transmission sheet light escaping from said light transmission sheet through the interrupted indicia delineating portions of said opaque coating.

2. An instrument panel comprising a light transmission sheet having an opaque backing, a light source operable to project light edgewise in said light transmission sheet, and a facing sheet in proximate face-to-face relation to said light transmission sheet, said facing sheet being of transparent material and having an opaque coating covering the surface thereof next to said light transmission sheet, said opaque coating being interrupted to delineate indicia in areas where said facing sheet is uninterrupted and is operable to transmit to the surface of said facing sheet remote from said light transmission sheet light escaping from said light transmission sheet through the interrupted indicia delineating portions of said opaque coating.

3. An instrument panel comprising a facing sheet of transparent material having an opaque coating covering a surface thereof and interrupted to delineate indicia in areas where said facing sheet is uninterrupted and is operable to transmit from its coated surface to its opposite surface light penetrating the interrupted indicia delineating portions of said opaque coating, a light transmission sheet in proximate face-to-face relation to the coated side of said facing sheet, and a light source operable to project light edgewise into said light transmission sheet, the side of said light transmission sheet remote from said facing sheet being roughened but only on that portion of its surface substantially in registry with the interrupted indicia delineating portions of said opaque coating on said facing sheet and the opposite side of said light transmission sheet being smooth, to effect release of light from such light transmission sheet into said facing sheet.

4. An instrument panel comprising a facing sheet of transparent material having an opaque coating covering a surface thereof and interrupted to delineate indicia in a plurality of areas at different distances from said light source when said facing sheet is uninterrupted and is operable to transmit from its coated surface to its opposite surface light penetrating the interrupted indicia delineating portions of said opaque coating, a light transmission sheet in proximate face-to-face relation to the coated side of said facing sheet, and a light source operable to project light edgewise into said light transmission sheet, the side of said light transmission sheet remote from said facing sheet being roughened by a coating of paint of light reflecting character substantially in registry with the interrupted indicia delineating portions of said opaque coating on said facing sheet, said paint coating being thicker on a portion of said light transmission sheet in registry with an interruption in the opaque coating of said facing sheet farther from said light source than is the paint coating on a portion of said light transmission sheet in registery with an interruption of said opaque coating on said facing sheet nearer the light source to equalize substantially the intensity of light reflected from the two paint coatings through the interruptions in the opaque coating of the facing sheet, thus to equalize substantially the intensity of illumination transmitted through said facing sheet, the opposite side of said light transmission sheet from said paint coating being smooth to effect release of light from such light transmission sheet into said facing sheet.

5. An instrument panel comprising an opaque backing sheet having an element mounted thereon, a facing sheet opaque over at least a large part of its area but light penetrable in registry with said element, an intermediate light transmission sheet interposed between at least a portion of said backing sheet and said facing sheet and having an aperture therethrough in registry with but at least partially in front of said element for release of light from the edge of said aperture to said element, means operable to secure said backing sheet, said intermediate sheet and said facing sheet in contacting face-to-face relationship, and a light source operable to project light edgewise into said intermediate sheet.

References Cited in the file of this patent

UNITED STATES PATENTS

| | | |
|---|---|---|
| 2,213,868 | Lucian | Sept. 2, 1940 |
| 2,223,409 | Dixon | Dec. 3, 1940 |
| 2,347,665 | Christensen | May 2, 1944 |
| 2,507,035 | Maynard | May 9, 1950 |
| 2,518,726 | Shlenker | Aug. 15, 1950 |
| 2,537,971 | Dames | Jan. 16, 1951 |
| 2,566,026 | Hughes | Aug. 28, 1951 |
| 2,595,973 | Neugass | May 6, 1952 |
| 2,602,036 | Sullivan | July 1, 1952 |
| 2,663,107 | Moler et al. | Dec. 22, 1953 |

UNITED STATES PATENT OFFICE
CERTIFICATE OF CORRECTION

Patent No. 2,848,830 August 26, 1958

Nickolas T. Dmitriev et al

It is hereby certified that error appears in the printed specification of the above numbered patent requiring correction and that the said Letters Patent should read as corrected below.

Column 6, line 67, for "edgewise in said" read -- edgewise into said --; column 7, line 25, for "when" read -- where --; column 8, lines 16 and 17, strike out "at least a portion of" and insert the same after "partially in front of" in line 19, same column.

Signed and sealed this 11th day of November 1958.

(SEAL)
Attest:

KARL H. AXLINE
Attesting Officer

ROBERT C. WATSON
Commissioner of Patents